(12) United States Patent
Yan (10) Patent No.: US 10,774,895 B2
(45) Date of Patent: Sep. 15, 2020

(54) CLAMPED FREQUENCY DEPENDENT PISTON ASSEMBLY

(71) Applicant: Shi Yan, Schilde (BE)

(72) Inventor: Shi Yan, Schilde (BE)

(73) Assignee: Plush Ride GmbH, Aachen (DE)

( * ) Notice: Subject to any disclaimer, the term of this patent is extended or adjusted under 35 U.S.C. 154(b) by 64 days.

(21) Appl. No.: 16/067,608

(22) PCT Filed: Jan. 1, 2017

(86) PCT No.: PCT/BE2017/000001
§ 371 (c)(1),
(2) Date: Jul. 1, 2018

(87) PCT Pub. No.: WO2017/112978
PCT Pub. Date: Jul. 6, 2017

(65) Prior Publication Data
US 2019/0017566 A1    Jan. 17, 2019

(30) Foreign Application Priority Data

Jan. 1, 2016   (BE) .................................. 2016/0013

(51) Int. Cl.
*F16F 9/348* (2006.01)
*F16F 9/516* (2006.01)
*F16F 13/08* (2006.01)

(52) U.S. Cl.
CPC ............ *F16F 9/3488* (2013.01); *F16F 9/516* (2013.01); *F16F 13/08* (2013.01)

(58) Field of Classification Search
CPC ........ F16F 9/348; F16F 9/3485; F16F 9/3488; F16F 9/516

(Continued)

(56) References Cited

U.S. PATENT DOCUMENTS 5,018,608 A * 5/1991 Imaizumi .................. F16F 9/50
                                                      188/282.5
5,735,372 A * 4/1998 Hamilton .................. F16F 9/46
                                                      188/266.6
(Continued)

FOREIGN PATENT DOCUMENTS

DE   10 2014 008993 A1   4/2015
WO      03/040586 A1     5/2003
(Continued)

OTHER PUBLICATIONS

ISR; European Patent Office; NL. Mar. 31, 2017.

*Primary Examiner* — Thomas J Williams
(74) *Attorney, Agent, or Firm* — Patshegen IP LLC; Moshe Pinchas (57) ABSTRACT

A frequency dependent piston assembly (1) for a shock absorber comprising: a piston (10) disposed within a portion of cylinder (20), dividing volume enclosed within said portion of cylinder (20) into a first chamber (21) and a second chamber (22), said piston (10) comprising a first flow channel (111) connecting said first chamber (21) and said second chamber (22); characterized in that said piston assembly (1) further comprises: a first fluid accumulator (300); a first fluid channel (200) connecting said first fluid accumulator (300) with the side of said piston (10) closest to said first accumulator (300); a first valve assembly (100) controlling the passage of fluid (150) from said first chamber (21) to said second chamber (22), said first valve assembly (100) being configured in such a way that its preload force is controlled by said first fluid accumulator (300).

10 Claims, 5 Drawing Sheets

(58) Field of Classification Search
USPC .......... 188/281, 282.1, 282.5, 282.6, 322.13, 188/322.15
See application file for complete search history.

(56) References Cited

U.S. PATENT DOCUMENTS

| | | | | |
|---|---|---|---|---|
| 7,458,448 | B2* | 12/2008 | Katou | F16F 9/3485 |
| | | | | 188/282.6 |
| 7,997,394 | B2* | 8/2011 | Yamaguchi | F16F 9/465 |
| | | | | 188/266.2 |
| 8,794,400 | B2* | 8/2014 | Nakadate | F16F 9/464 |
| | | | | 188/266.6 |
| 9,200,693 | B2* | 12/2015 | Lim | F16F 9/3485 |
| 9,534,653 | B2* | 1/2017 | Kim | F16F 9/3405 |
| 9,976,622 | B2* | 5/2018 | Kim | F16F 9/348 |
| 2015/0114774 | A1 | 4/2015 | Kim | |
| 2015/0276005 | A1 | 10/2015 | Kim | |
| 2019/0003550 | A1* | 1/2019 | Yan | F16F 9/5126 |

FOREIGN PATENT DOCUMENTS

| | | | |
|---|---|---|---|
| WO | 2013/051934 | A1 | 4/2013 |
| WO | 2015/030884 | A1 | 3/2015 |
| WO | 2015/130544 | A1 | 9/2015 |

* cited by examiner

CLAMPED FREQUENCY DEPENDENT PISTON ASSEMBLY

FIELD OF THE INVENTION

The present disclosure relates to hydraulic shock absorbers and dampers which can be adapted for use in a suspension system such as the systems used for transportation vehicles. More particularly, the present disclosure relates to a frequency dependent shock absorber, to provide different damping characteristics when subjected to input of differing frequencies.

BACKGROUND OF THE INVENTION AND PRIOR ART

Frequency dependent hydraulic dampers from prior art work on the principle of having a frequency dependent bypass channel to a main piston. These dampers still require a conventional main piston assembly to set the low frequency damping characteristics, and require a significant (~10 mm$^2$) bypass flow channel to be modified into the rod's piston post. Examples of such prior art dampers are disclosed, for instance in documents WO03040586, WO2013051934, WO2015130544, WO2015030884.

There are three main problems of these dampers:
1) Reduced safety margin due to removal of material from a crucial structural location, the piston post, with possible fatal consequences in case of a strut suspension under side load.
2) Frequency dependent effect less effective at higher damper speeds due to restriction posed by limited flow channel in piston post.
3) Reduced damper travel leading to more end stop impacts which speed up damage to vehicle body and reduce comfort.

The damper disclosed in US2015276005 partially solves problems 3) and 2), but does not solve problem 1) and has the additional problem of: 4) Only being frequency dependent in one direction.

SUMMARY OF THE INVENTION

The present invention solves all 4 problems mentioned above as per the claims annexed to the present disclosure.

BRIEF DESCRIPTION OF THE DRAWINGS

The accompanying drawings comprise.

DESCRIPTION OF REFERENCE NUMERALS

1: Frequency dependent piston assembly
10: Piston
  11: Flow channels (between first chamber and second chamber)
    111: First flow channel
    112: Second flow channel
    113: Third flow channel
    114: Fourth flow channel
12: Piston seal
13: Sealing element
20: Portion of a cylinder
  21: First chamber
  22: Second chamber
30: Portion of a rod
60: Electrically controlled valve
100: First valve assembly (controlling flow from first chamber to second chamber)
  150: Passage of fluid (from first chamber to second chamber)
  151: Bleed flow (from first chamber to second chamber)
200: First fluid channel (connected to accumulator 300)
300: First fluid accumulator (to control valve assembly 100)
  301: First accumulator wall (of first fluid accumulator)
  350: Incoming flow (to accumulator 300)
  360: Outgoing flow (from accumulator 300)
  380: First flow restrictor (for accumulator 300)
    382: First check disc
  390: First elastic element (for accumulator 300)
600: Second valve assembly (controlling flow from second chamber to first chamber)
  650: Passage of fluid (from second chamber to first chamber)
  651: Bleed flow (from second chamber to first chamber)
700: Second fluid channel (connected to accumulator 800)
800: Second fluid accumulator (to control valve assembly 100)
  801: Second accumulator wall (of second fluid accumulator)
  850: Incoming flow (to accumulator 800)
  860: Outgoing flow (from accumulator 800)
  880: Second flow restrictor (for accumulator 800)
    882: Second check disc
  890: Second elastic element (for accumulator 800)

DETAILED DESCRIPTION OF THE DRAWINGS

The following description of the preferred embodiment(s) is merely exemplary in nature and is in no way intended to limit the disclosure, its applications, or uses. Whenever the same reference number occurs on different drawings, the same reference number designates similar or corresponding parts throughout the different drawings.

Figure 1:
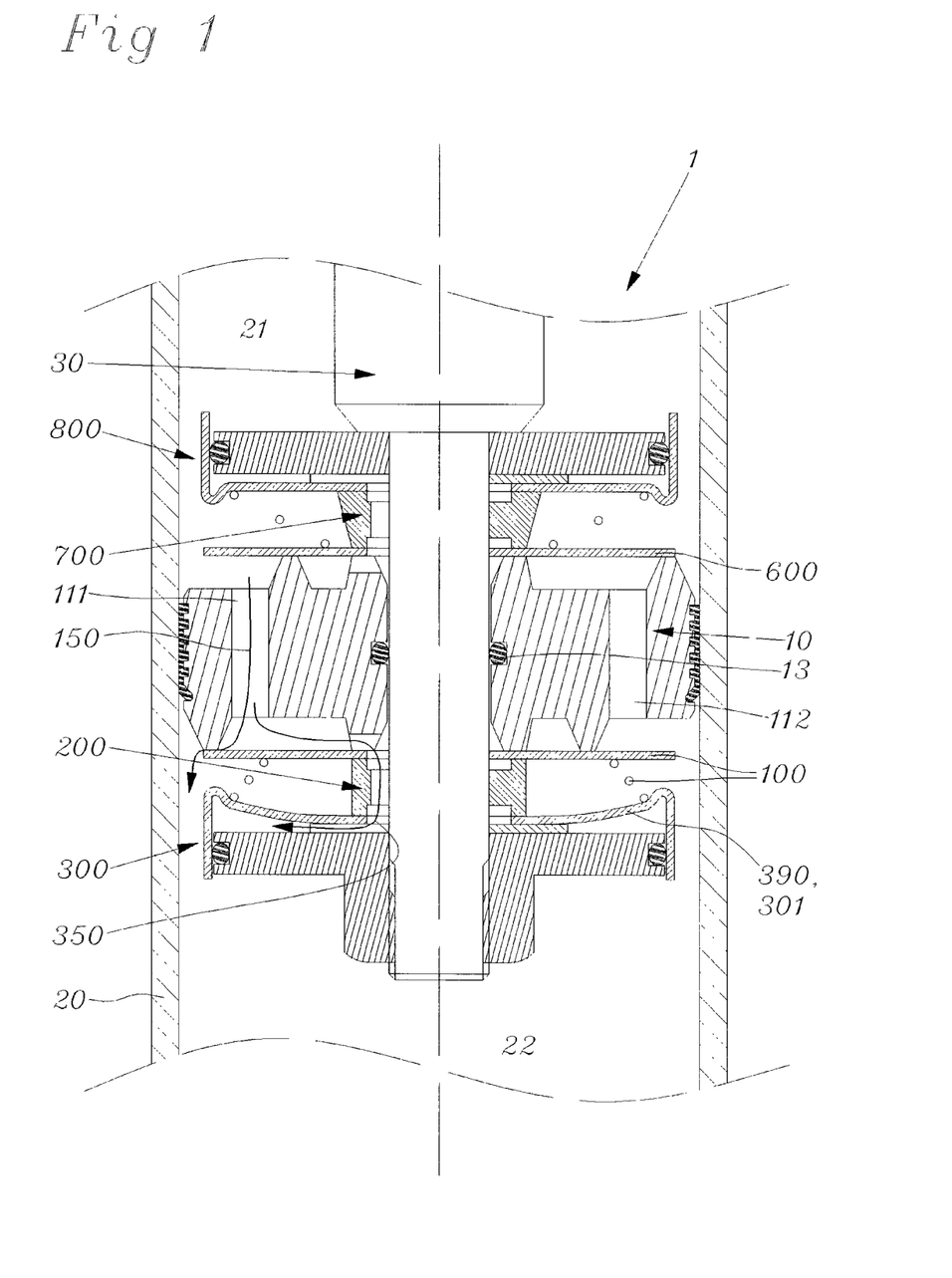
FIG. 1 shows a basic embodiment of the current invention

FIG. 1 shows a first embodiment of the invention, a frequency dependent piston assembly (1) for a shock absorber comprising:
a piston (10) disposed within a portion of cylinder (20), dividing volume enclosed within the portion of cylinder (20) into a first chamber (21) and a second chamber (22), the piston (10) comprising a first flow channel (111) defined by a hole through the piston (10), the first flow channel (111) connecting the first chamber (21) and the second chamber (22);
the piston assembly (1) further comprises:
a first fluid accumulator (300), disposed in said second chamber (22), comprising a first accumulator wall (301) that is movable according to the pressure differential between the first fluid accumulator (300) and the second chamber (22);
a first fluid channel (200) connecting the first fluid accumulator (300) with the side of the piston (10) closest to the accumulator (300), and connecting the first fluid accumulator (300) with the first flow channel (111);

a first valve assembly (100), interposed between the piston (10) and the second chamber (22), controlling the passage of fluid (150) from the first chamber (21) to the second chamber (22), the first valve assembly (100) being configured in such a way that its preload force is controlled by the first fluid accumulator (300).

It is to be noted that, unlike US2015276005, the piston assembly (1) according to the present invention comprises a first fluid channel (200) connecting a first fluid accumulator (300) with the side of a piston (10) closest to the first fluid accumulator (300). This enables to solve problem 4) by placing a second fluid accumulator (800) and a second fluid channel (700) on the opposite side of the piston (10).

It is also to be noted that:
the first flow channel (111) in the piston (10), in the case of FIG. 1 is covered by the first valve assembly (100), does not need to be round in cross section;
the piston rod hole, on the central axis of the piston (10), is typically round in cross section.

Furthermore, the embodiment of FIG. 1 is in rebound travel, with first chamber (21) higher in pressure than second chamber (22).

The piston assembly (1) comprises a sealing element (13) which prevents fluid flow through the gap defined between said piston (10) and a portion of rod (30) passing through the central axis of said piston (10). In embodiments where two fluid accumulator (300, 800) are used, the sealing element (13) helps keep the two fluid channels (200, 700) separate from each other. The sealing element (13) could be an O-ring, compressed slightly between the inner hole through the axis of the piston (100) and the portion of (piston) rod (30), to provide a seal.

Although the piston assembly (1) according to the present invention can be implemented with a single fluid accumulator, thus applying the inventive concept to only one direction of travel of the piston, it is clear that the same configuration is possible in both direction of travel. In the following such a configuration, comprising a second fluid accumulator (800) will be described, also referring to FIG. 1. It is clear that the skilled person would have no difficulty in selecting, and implementing, one of the two alternative configuration, i.e. with one or two fluid accumulators.

Thus, the piston assembly (1) as depicted in FIG. 1, further comprises:

a second fluid accumulator (800) disposed in the first chamber (21);

a second fluid channel (700) connecting the second fluid accumulator (800) with the side of the piston (10) closest to the second accumulator (800);

a second valve assembly (600) interposed between the piston (10) and the first chamber (21), controlling the passage of fluid (650) from the second chamber (22) to the first chamber (21), the second valve assembly (600) being configured in such a way that its preload force is controlled by the second fluid accumulator (800).

A portion of said first fluid channel (200) is formed by cutouts in one or more shim discs. A shim disc in this case typically being a thin annular/ring shaped disc, used to control fluid flow through the damper piston. In this embodiment, the cutout can be seen on the inner diameter of the shim disc in valve assembly (100), allowing passage of fluid flow (350) towards the first fluid accumulator (300). Although shim discs are typically ring shaped, special non uniform shaped shim discs also exist.

A portion of the first fluid channel (200) is defined by the piston (10). In this embodiment it can be seen that after exiting first flow channel (111), the fluid flow (350) goes toward the first fluid accumulator (300) and first flows through a space defined by the shim disc of the first valve assembly (100) and the side of the piston (10) closest to the first fluid accumulator passing through a cutout in the piston (10) before passing through the cutout in the shim disc of the first valve assembly (100).

The first fluid accumulator (300) comprises a first accumulator wall (301) that is flexible. This first accumulator wall (301), in this embodiment is made of a thin metal sheet, is flexible so that it is able to flex as shown in the drawings, allowing the first fluid accumulator (300) to expand and preload the coil spring of the first valve assembly (100). In its relaxed state the first accumulator wall takes the form of a shallow cup, having a flat bottom, as shown for the second accumulator wall (801) in the second fluid accumulator (800). A sealing element is interposed between the first accumulator wall and the base of the first fluid accumulator (300) preventing fluid to escape between these two.

It is possible to envisage alternative embodiments wherein the accumulator wall is not flexible and the fluid accumulator is configured as a piston-cylinder assembly which can expand and contract achieving the same effect as in the configuration of FIG. 1, if a suitable elastic element opposing change in volume of the fluid accumulator is foreseen.

The piston assembly (1) further comprises a first elastic element (390) configured to help said first valve assembly (100) oppose change in volume of said first fluid accumulator (300). As the first fluid accumulator (300) expands and preloads the first valve assembly (100), the first valve assembly imparts the same force in the opposite direction on the first fluid accumulator (300), opposing its expansion. It is however advantageous to have a tunable first elastic element (390) impart an additional force opposing the increase in volume of the first fluid accumulator (300), which does so without adding to the preload force on the first valve assembly (100).

The first elastic element (390) is the first accumulator wall (301) itself. Due to the fact that the first accumulator wall (301) has to flex as first fluid accumulator (300) expands, by its own configuration it opposes the expansion of the first fluid accumulator (300), and thus helps the first valve assembly (100) oppose a change in volume of the first fluid accumulator The piston (10) is connected to a stepped smaller diameter portion (31) of a rod (30), the rod (30) projects out of and reciprocates in the cylinder (20).

The first fluid accumulator's (300) base also functions as a clamping nut, clamping the rest of the piston assembly (10) to the rod. Combining the two functions saves both space and reduces cost.

Figure 2:
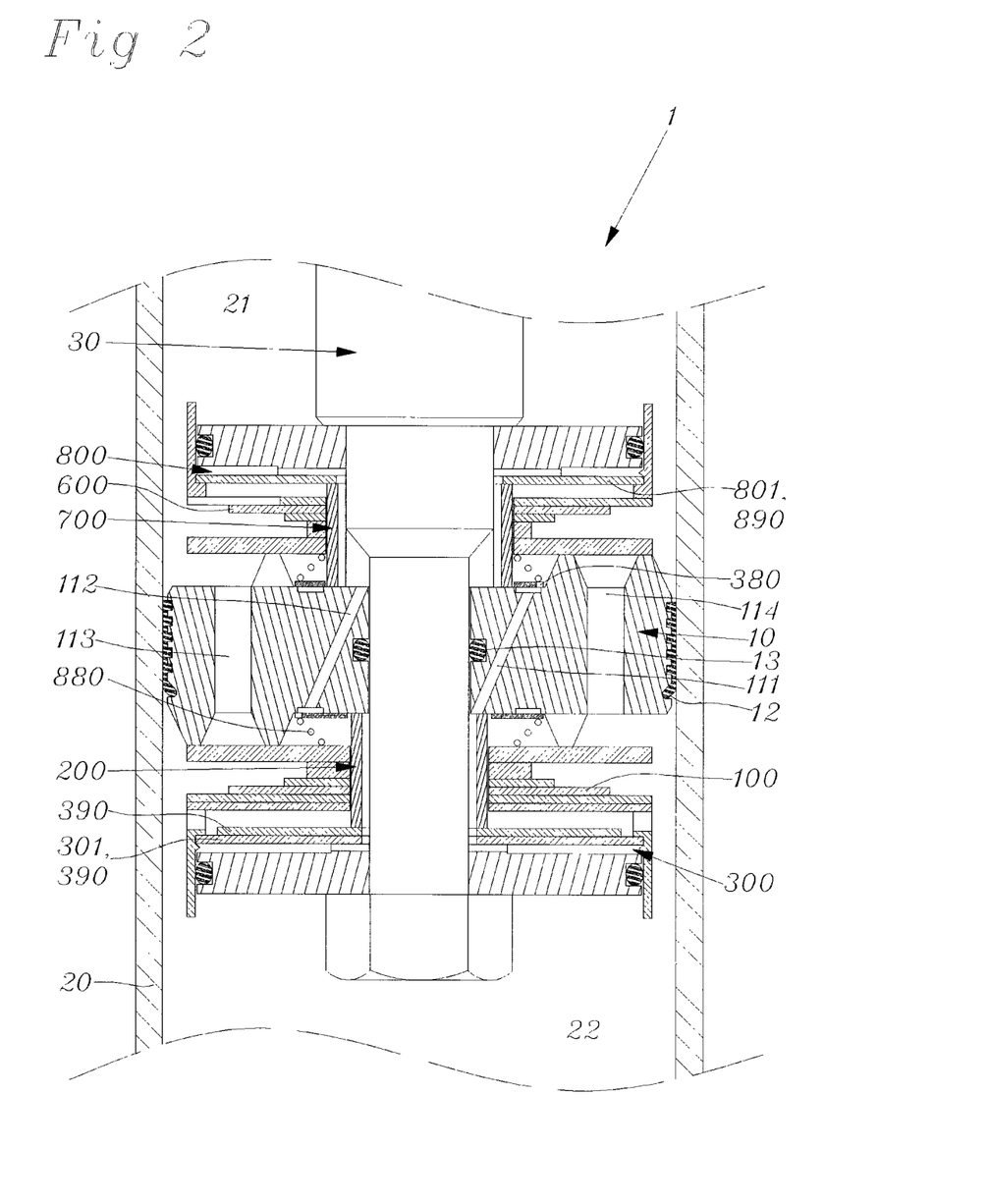
FIG. 2 shows a more typical embodiment of the current invention

FIG. 2 shows a second embodiment. This embodiment is frequency dependent in both rebound and compression, with two sets of valve assemblies: (100) for rebound, (600) for compression, and two sets of corresponding fluid channels (200), (700), and fluid accumulators (300), (800). This embodiments also comprises more valve discs in the first valve assembly (100) and the valve discs "floating" rather than being clamped at their inner diameter.

The piston assembly (1) according to the embodiment in FIG. 2 also comprises:

a first flow restrictor (380) to throttle fluid flow into or out of the first fluid accumulator (300), to be able to accurately tune the filling speed of the fluid accumulator, the first flow restrictor (380) comprises a check valve which opens up a bigger flow cross section depending on the flow direction, to allow a fast contraption of the first fluid accumulator;

the first accumulator wall (301) comprises a thin disc, and a shaped band into which the thin disc is snap engaged, rather than being a one piece thin walled shallow cup as in FIG. 1;

the first elastic element (390) also comprises a thin disc besides the first accumulator wall (301).

Figure 3:
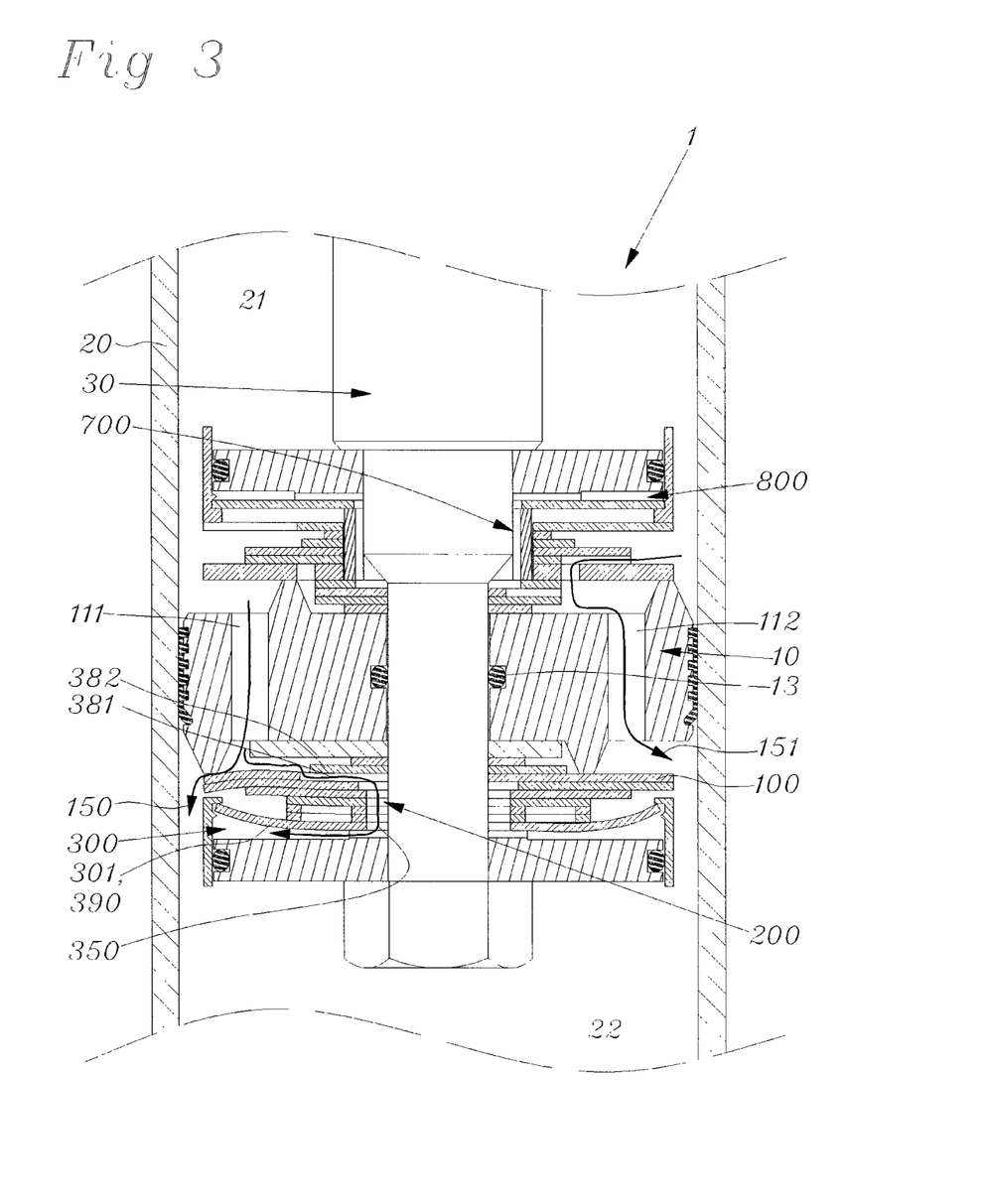
FIG. 3 shows another embodiment after some time spent in rebound travel

FIG. 3 shows a third embodiment depicted some time after the rebound travel has started. This embodiment makes use of an orifice disc with a flow slot which changes width from the end at the inner diameter to the end at the outer diameter. At the disc's outer diameter the flow slot is quite narrow, however the flow slot increases in width towards the disc's inner diameter. Use of such an orifice disc has the advantage of opening up a larger flow cross section when fluid flows in the direction to lift the adjacent valve disc, while limiting flow cross section to the narrow slot width at the outer diameter of the orifice disc when fluid flows in the opposite direction, when the adjacent valve disc is pulled towards the orifice disc.

After some time in the rebound travel, the first fluid accumulator (300) has increased in volume, due to an incoming flow (350) into it and having had sufficient time. Increase in volume of the first fluid accumulator (300) results in increased preload force on first the valve assembly (100), which results in more throttling of fluid flow from the first chamber (21) into the second chamber (22) via the first flow channel (111).

Figure 4:
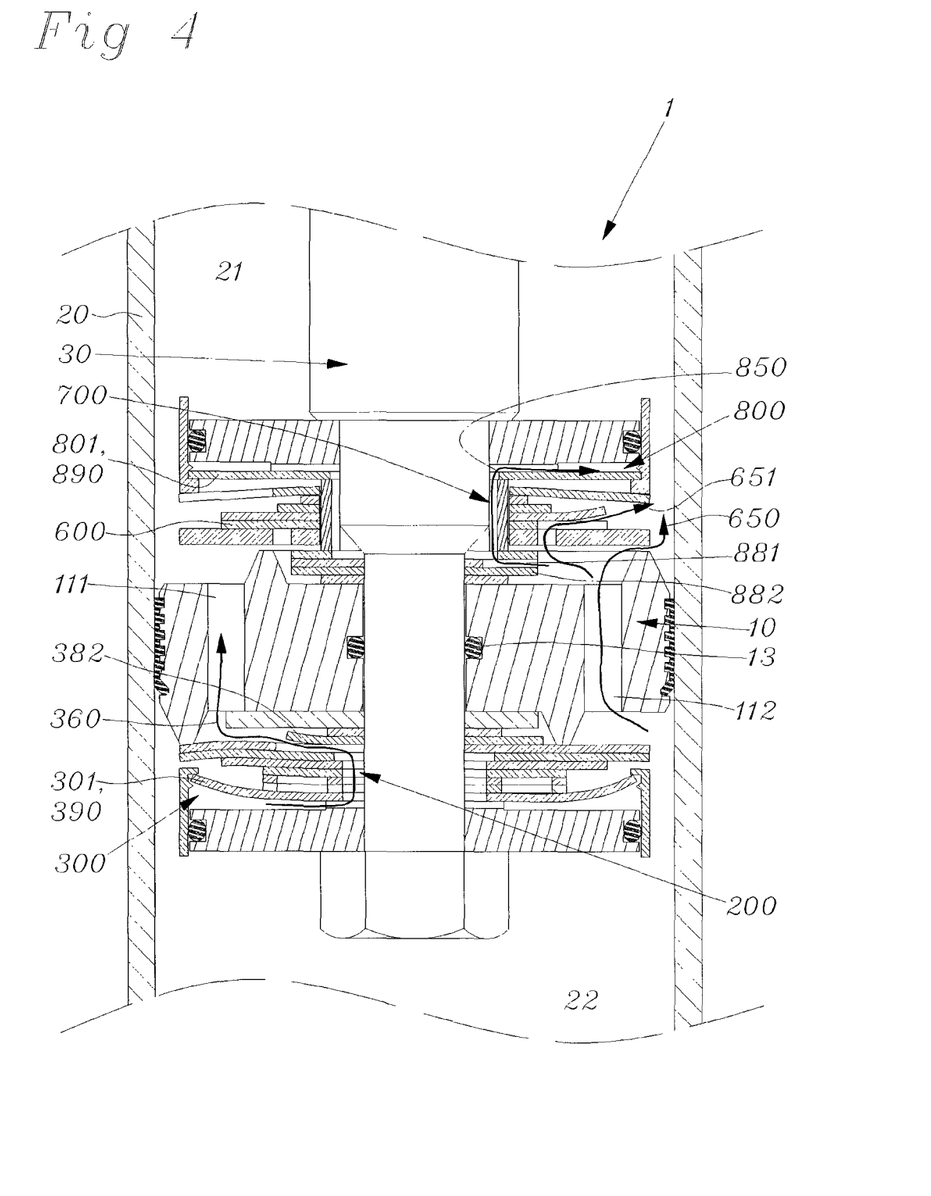
FIG. 4 shows embodiment from FIG. 3 at the start of compression travel after some time spent in rebound travel

Shown in FIG. 4 is the third embodiment just after it has finished the rebound travel, at the start of compression travel. It can be seen that the first fluid accumulator (300) is now quickly emptying, thanks to first check disc (382) opening up a large flow path for the first fluid accumulator outgoing flow (360). Soon, well before the compression stroke has finished, the first accumulator (300) will return to its default state, as in the situation with the damper at rest, with an un-flexed first accumulator wall (301) as in FIG. 2 or the second accumulator wall (801) as in FIG. 3. On the other side of the piston (10) the second compression valve assembly (600) is under very little preload. Passage of fluid (650) from the second chamber (22) to the first chamber (21) is therefore able to pass through the second flow channel (112) quite easily in the state depicted. If the compression travel continues, however, incoming flow (850) into the second fluid accumulator (800) will have sufficient time to increase its volume and add preload force on the second valve assembly (600), which will result in more throttling of passage of fluid (650) from the second chamber (22) into the first chamber (21) via the second flow channel (112).

Figure 5:
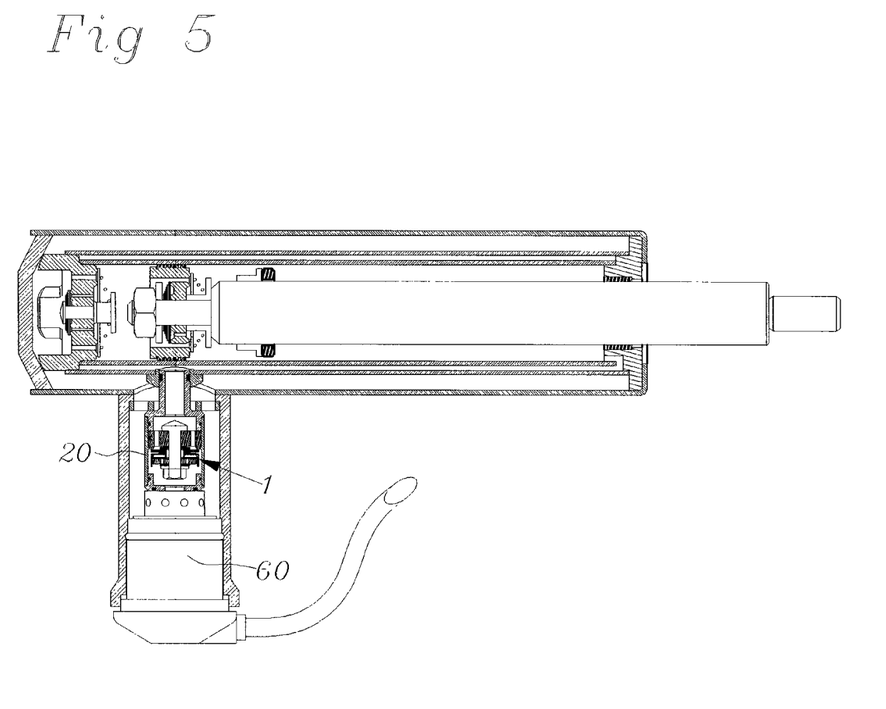
FIG. 5 shows piston assembly of the invention (1) being used hydraulically in series with an electrically controlled valve (60).

Shown in FIG. 5 is a fourth embodiment with piston assembly of the invention (1) being used hydraulically in series with an electrically controlled valve (60). By being hydraulically in series with the electrically controlled valve (60), the frequency dependent piston assembly (10) adds its pressure drop characteristics on top of the pressure drop generated by the electrically controlled valve (60). Also visible in FIG. 5 is how:

the cylinder (20) is a housing;

the shock absorber further comprises an electrically controlled valve (60), comprising an electromagnetic coil, the electrically controlled valve comprises an electromagnetic coil so that an electric current can be used to control damping force.

It is to be noted that although Claim 1 makes mention of "first", it does not have to imply that there is a "second", as the "second" elements (valve assembly, fluid accumulator, fluid channel . . . ) are optional.

While the present invention has been described with reference to the embodiments, it will be apparent to those skilled in the art that various changes and modifications may be made as defined in the following claims.

What is claimed is:

1. A frequency dependent piston assembly (1) for a shock absorber comprising:
   a piston (10) disposed within a portion of cylinder (20), dividing volume enclosed within said portion of cylinder (20) into a first chamber (21) and a second chamber (22), said piston (10) comprising a first flow channel (111) connecting said first chamber (21) and said second chamber (22);
   characterized in that said piston assembly (1) further comprises:
   a first fluid accumulator (300);
   a first fluid channel (200) for providing fluid flow into said first fluid accumulator (300), wherein said first flow channel (111) is defined by a hole through said piston (10), and said first fluid channel (200) connects said first fluid accumulator (300) with said first flow channel (111)
   a first valve assembly (100) controlling the passage of fluid (150) from said first chamber (21) to said second chamber (22), said first valve assembly (100) being configured in such a way that its preload force is controlled by said first fluid accumulator (300), said first fluid accumulator (300) including a first accumulator wall (301) that is flexible and is configured such that in a relaxed state said first accumulator wall is in the form of a cup facing away from said first valve assembly;
   a first flow restrictor (380) to throttle fluid flow into or out of said first fluid accumulator (300); and
   a first elastic element (390) configured to help said first valve assembly (100) oppose change in volume of said first fluid accumulator (300).

2. The piston assembly (1) according to claim 1, characterized in that:
   said first fluid accumulator (300) is disposed in said second chamber (22), comprising said first accumulator wall (301) that is movable according to the pressure differential between said first fluid accumulator (300) and said second chamber (22);
   said valve assembly (100) is interposed between said piston (10) and said second chamber (22).

3. The piston assembly (1) according to claim 2, characterized in that said piston assembly (1) further comprises:
   a second fluid accumulator (800) disposed in said first chamber (21);
   a second fluid channel (700) connecting said second fluid accumulator (800) with the side of said piston (10) closest to said second accumulator (800);
   a second valve assembly (600) interposed between said piston (10) and said first chamber (21), controlling the passage of fluid (650) from said second chamber (22) to said first chamber (21),
   said second valve assembly (600) being configured in such a way that its preload force is controlled by said second fluid accumulator (800).

4. The piston assembly (1) according to claim 1, characterized in that said piston assembly (1) further comprises:

a sealing element (13) which prevents fluid flow through a gap defined between said piston (10) and a portion of rod (30) passing through the central axis of said piston (10).

5. The piston assembly (1) according to claim 1, characterized in that:
a portion of said first fluid channel (200) is formed by cutouts in one or more shim discs.

6. The piston assembly (1) according to claim 1, characterized in that:
a portion of said first fluid channel (200) is defined by said piston (10).

7. The piston assembly (1) according to claim 1, characterized in that:
said first flow restrictor (380) opens up a bigger flow cross section depending on flow direction.

8. The piston assembly (1) according to the claim 7, characterized in that said piston assembly (1) further comprises:
an orifice disc with a flow slot which changes slot cross section from its inner diameter to outer diameter.

9. A shock absorber comprising said piston assembly (1) according to claim 1, characterized in that said shock absorber further comprises:
an electrically controlled valve (60), comprising an electromagnetic coil.

10. The shock absorber according to the claim 9, characterized in that:
said electrically controlled valve (60) is hydraulically in series with said piston assembly (1).

* * * * *